(12) United States Patent
Nalakath et al.

(10) Patent No.: US 11,394,327 B2
(45) Date of Patent: Jul. 19, 2022

(54) METHODS AND SYSTEMS FOR DETECTING A ROTOR POSITION AND ROTOR SPEED OF AN ALTERNATING CURRENT ELECTRICAL MACHINE

(71) Applicant: BorgWarner Inc., Auburn Hills, MI (US)

(72) Inventors: Shamsuddeen Nalakath, Hamilton (CA); Dianxun Xiao, Hamilton (CA); Jia Xiu Dong, Hamilton (CA); Gaoliang Fang, Hamilton (CA); Ali Emadi, Hamilton (CA); Yingguang Sun, Kitchener (CA); Jason Wiseman, Kitchener (CA)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/232,893

(22) Filed: Apr. 16, 2021

(65) Prior Publication Data

US 2021/0336572 A1 Oct. 28, 2021

Related U.S. Application Data

(60) Provisional application No. 63/014,819, filed on Apr. 24, 2020.

(51) Int. Cl.
*H02P 21/18* (2016.01)
*H02P 27/05* (2006.01)
(Continued)

(52) U.S. Cl.
CPC ............ *H02P 21/18* (2016.02); *B60L 3/0038* (2013.01); *B60L 50/51* (2019.02); *H02P 27/05* (2013.01);
(Continued)

(58) Field of Classification Search
CPC .......... H02P 21/18; H02P 27/05; H02P 6/182; B60L 3/0038; B60L 50/51; B60L 2240/421; B60L 2240/427; B60L 2240/429
See application file for complete search history.

(56) References Cited

U.S. PATENT DOCUMENTS 6,724,168 B2 * 4/2004 Cheong ................... H02P 21/24
318/700
8,884,566 B2 11/2014 Cao et al.
(Continued)

FOREIGN PATENT DOCUMENTS

CN 107342713 A * 11/2017

*Primary Examiner* — Bickey Dhakal
(74) *Attorney, Agent, or Firm* — Burris Law, PLLC

(57) ABSTRACT

A method for determining rotor characteristic of an alternating current (AC) electrical machine includes obtaining a reference voltage signal, one or more phase currents, and rotor data. The method includes determining orthogonal components of an extended back electromotive force (BEMF) model of the AC electrical machine based on the reference voltage signal, the one or more phase current characteristics, and the rotor data. The method includes determining a product of the orthogonal components of the extended BEMF model. The method includes determining a squared-magnitude of the orthogonal components of the extended BEMF mode. The method includes determining the rotor characteristic of the AC electrical machine based on the product of the orthogonal components and the squared-magnitude of the orthogonal components.

22 Claims, 4 Drawing Sheets

(51) Int. Cl.
   *B60L 50/51* (2019.01)
   *B60L 3/00* (2019.01)
(52) U.S. Cl.
   CPC ... *B60L 2240/421* (2013.01); *B60L 2240/427* (2013.01); *B60L 2240/429* (2013.01)

(56) References Cited

U.S. PATENT DOCUMENTS

| | | | |
|---|---|---|---|
| 8,896,249 | B2 | 11/2014 | Cao et al. |
| 9,425,725 | B2 | 8/2016 | Melanson |
| 9,831,809 | B1* | 11/2017 | Takai .................. H02P 21/24 |
| 2001/0043048 | A1 | 11/2001 | Tajima et al. |
| 2010/0109584 | A1 | 5/2010 | Kwon et al. |
| 2010/0237817 | A1 | 9/2010 | Liu et al. |
| 2010/0264861 | A1 | 10/2010 | Basic et al. |
| 2010/0320763 | A1 | 12/2010 | Li et al. |
| 2015/0365029 | A1* | 12/2015 | Yang .................... B60L 15/025 318/400.34 |
| 2016/0202296 | A1 | 7/2016 | Costanzo et al. |
| 2017/0126153 | A1* | 5/2017 | Lepka ................ H02P 29/0241 |

* cited by examiner

METHODS AND SYSTEMS FOR DETECTING A ROTOR POSITION AND ROTOR SPEED OF AN ALTERNATING CURRENT ELECTRICAL MACHINE

CROSS-REFERENCE TO RELATED APPLICATIONS

This application claims the benefit of U.S. Provisional Application No. 63/014,819 filed Apr. 24, 2020, the disclosure of which is incorporated by reference as if fully set forth in detail herein.

FIELD

The present disclosure relates to systems and methods for detecting a rotor position and a rotor speed of an alternating current (AC) electrical machine.

BACKGROUND

The statements in this section merely provide background information related to the present disclosure and may not constitute prior art.

AC electric machines provide electric power to various components and systems, such as a hybrid electric vehicle (HEV), an electric vehicle (EV), and the like. A controller communicatively coupled to the AC electric machine may obtain performance data from one or more sensors of the AC electric machine to evaluate various performance characteristics of the AC electric machine. As an example, the controller may obtain sensor data from a rotor position sensor (e.g., an encoder, an electromagnetic resolver, among others) to determine a position of a rotor of a permanent magnet synchronous motor (PMSM) and to perform field-oriented control routines. However, rotor position sensors may increase the size of the AC electric machine and the complexity of the controller logic needed to process the sensor data. Furthermore, low fault-tolerances of the rotor position sensors may render the position data unreliable for determining the position of the rotor.

To address the fault-tolerances of the rotor position sensors, the controller may additionally (or alternatively) include a position estimation system. The position estimation system may include a signal conditioner and a phase-locked loop (PLL) system. The operation of the signal conditioner may be defined based on the AC electrical machine topologies, operating speeds, and control routines.

For AC electrical machines that operate at low speeds, the signal conditioner may perform a heterodyning routine, which includes demodulating a response of an injected high-frequency carrier signal (e.g., pulse vectors, square waves, among others) to extract the rotor position. As an example, when injecting a pulse vector, the signal conditioner may determine the rotor position based on the current derivative response of the pulse vector. As another example, when injecting a square wave, the signal conditioner may determine the rotor position based on the current envelope or the quadrature-axis current response. However, modeling errors and phase errors introduced by digital filters make the heterodyning routine unsuitable for determining the rotor position at higher speeds.

For AC electrical machines that operate at high speeds, the signal conditioner may determine the rotor position by performing an arctangent routine or a quadrature PLL routine on the quadrature components of an extended back electromotive force (BEMF) model of the AC electrical machine. However, the arctangent routine and the quadrature PLL routine do not separate the rotor position information embedded with high-frequency current responses, thereby making these routines unsuitable for determining the rotor position at lower or idle speeds.

SUMMARY

This section provides a general summary of the disclosure and is not a comprehensive disclosure of its full scope or all of its features.

A method for determining rotor characteristic of an alternating current (AC) electrical machine includes obtaining a reference voltage signal, one or more phase currents, and rotor data. The method includes determining orthogonal components of an extended back electromotive force (BEMF) model of the AC electrical machine based on the reference voltage signal, the one or more phase current characteristics, and the rotor data. The method includes determining a product of the orthogonal components of the extended BEMF model. The method includes determining a squared-magnitude of the orthogonal components of the extended BEMF mode. The method includes determining the rotor characteristic of the AC electrical machine based on the product of the orthogonal components and the squared-magnitude of the orthogonal components.

In some forms, the rotor characteristic is at least one of a rotor position and a rotor speed.

In some forms, determining orthogonal components of the extended BEMF model of the AC electrical machine further includes converting at least one of the reference voltage signal, the one or more phase currents, and the rotor data into a two axis rotating reference frame.

In some forms, determining the rotor characteristic of the AC electrical machine based on the product of the orthogonal components and the squared-magnitude of the orthogonal components further includes generating an angular position error signal.

In some forms, generating the angular position error signal further includes dividing the product of the orthogonal components by the squared-magnitude of the orthogonal components.

In some forms, determining the rotor characteristic of the AC electrical machine based on the product of the orthogonal components and the squared-magnitude of the orthogonal components further includes determining a rotor speed based on the angular position error signal.

In some forms, determining the rotor characteristic of the AC electrical machine based on the product of the orthogonal components and the squared-magnitude of the orthogonal components further includes determining a rotor speed based on the angular position error signal and determining a rotor position based on the rotor speed.

The present disclosure provides a method for determining rotor characteristic of an alternating current (AC) electrical machine. The method includes obtaining a reference voltage signal, one or more phase currents, and rotor data. The method includes determining orthogonal components of an extended back electromotive force (BEMF) model of the AC electrical machine based on the reference voltage signal, the one or more phase current characteristics, and the rotor data. The method includes determining a product of the orthogonal components of the extended BEMF model. The method includes determining a squared-magnitude of the orthogonal components of the extended BEMF model. The method includes determining a squared-difference of the orthogonal components of the extended BEMF model. The method includes determining the rotor characteristic of the AC electrical machine based on the product of the orthogonal components, the squared-magnitude of the orthogonal components, and the squared-difference of the orthogonal components.

In some forms, the rotor characteristic is at least one of a rotor position and a rotor speed.

In some forms, determining orthogonal components of the extended BEMF model of the AC electrical machine further includes converting at least one of the reference voltage signal, the one or more phase currents, and the rotor data into a two axis stationary reference frame.

In some forms, determining the rotor characteristic of the AC electrical machine based on the product of the orthogonal components and the squared-magnitude of the orthogonal components further includes generating an angular position error signal.

In some forms, generating the angular position error signal further includes dividing the product of the orthogonal components by the squared-magnitude of the orthogonal components.

In some forms, determining the rotor characteristic of the AC electrical machine based on the product of the orthogonal components and the squared-magnitude of the orthogonal components further includes determining a rotor speed based on the angular position error signal.

In some forms, generating the angular position error signal further comprises converting a previous rotor position to the angular position error signal.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
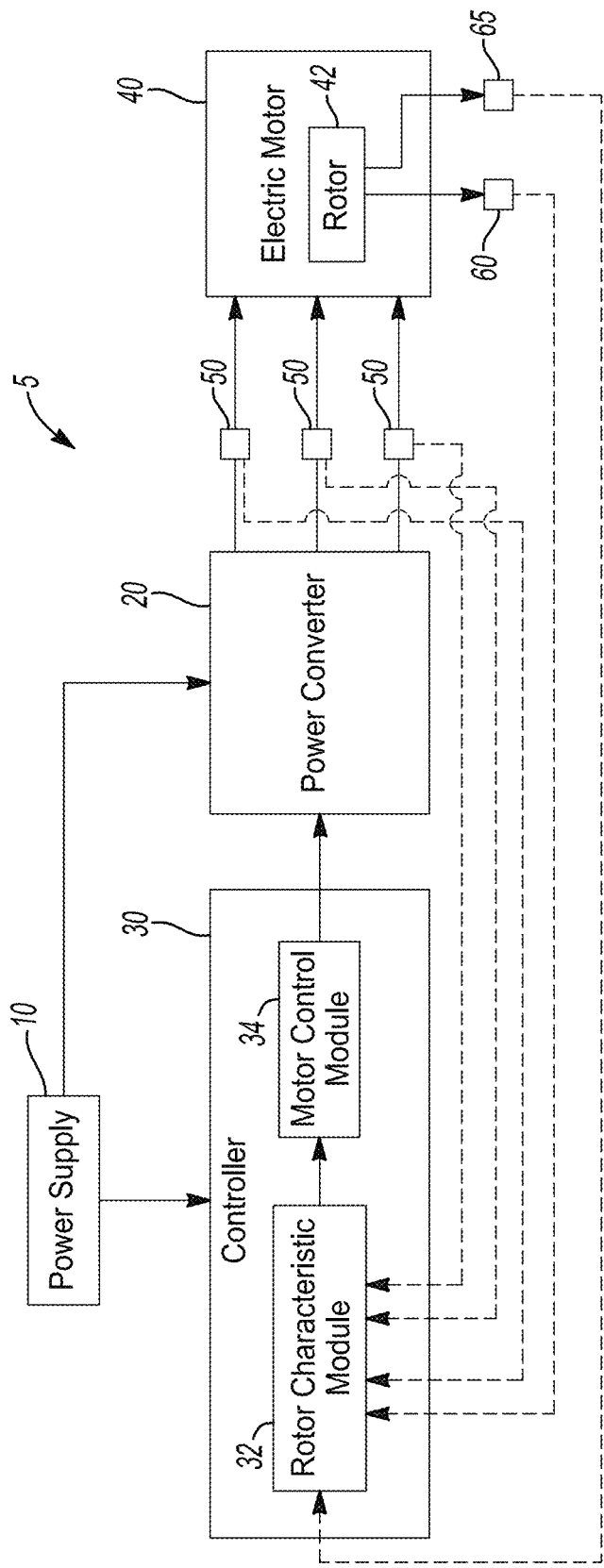
FIG. 1 is a block diagram of an example vehicle according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a system that determines the rotor position and rotor speed of AC electric machines at idle, low, and high operating speeds. A motor controller is configured to execute a position signal conditioning routine that extracts the rotor position information from a product of the orthogonal components of the extended BEMF. At low operating speeds, the product of the orthogonal components of the extended BEMF separates the rotor position information from the high-frequency components. At high operating speeds, the product of the orthogonal components of the extended BEMF includes the rotor position information and does not include high-frequency components as a result of an absence of a high-frequency injection. A PLL module subsequently determines the rotor position and rotor speed.

With reference to FIG. 1, vehicle 5 is shown. The vehicle 5 includes a power supply 10, a power converter 20, and a controller 30 that includes a rotor characteristic module 32 and a motor control module 34. Furthermore, the vehicle 5 includes an electric motor 40 that includes a rotor 42, phase current sensors 50, a rotor speed sensor 60, and a rotor position sensor 65. It should be understood that the vehicle 5 includes various other components and is not limited to the components described herein.

The power supply 10 is configured to provide electrical power to various components of the vehicle 5, such as the power converter 20 and the controller 30. As an example, the power supply 10 includes a direct current (DC) power source (e.g., one or more batteries) configured to provide DC electrical power. As another example, the power supply 10 includes an AC power source configured to provide the AC electrical power.

The power converter 20 includes one or more circuits configured to convert electrical power from the power supply 10 into a three-phase AC electrical signal and output the three-phase AC electrical signal to the electric motor 40. As an example, the power converter 20 may include an inverter circuit (e.g., a three-phase inverter circuit, a two-level voltage source inverter, a multilevel inverter, among others) that includes one or more switching devices, such as a bipolar junction transistor (BJT), an insulated gate bipolar transistor (IGBT), a metal-oxide semiconductor field-effect transistor (MOSFET), and/or the like. It should be understood that the power converter 20 may include various discrete and/or integrated circuits that output the three-phase AC electrical signal and is not limited to the examples described herein.

The controller 30 may include various hardware components, such as transceivers, routers, input/output ports, among others, to perform the functionality described herein. Furthermore, the rotor characteristic module 32 and the motor control module 34 of the controller 30 may be implemented by one or more processors configured to execute instructions stored in a nontransitory computer-readable medium, such as a random-access memory (RAM) and/or a read-only memory (ROM).

The rotor characteristic module 32 is configured to determine the speed of the rotor 42 based on sensor data generated by the rotor speed sensor 60. Furthermore, the rotor characteristic module 32 is configured to determine an angular position of the rotor 42 based on sensor data generated by the rotor position sensor 65. In some forms, the rotor characteristic module 32 is configured to determine the position and/or speed of the rotor 42 by performing a position signal conditioning routine, as described below in further detail with reference to FIGS. 2A-2B and 3-4.

The motor control module 34 is configured to selectively control the operation of the power converter 20 by controlling the voltage magnitude and/or the frequency of the three-phase AC electrical signal output to the electric motor 40. As an example, the motor control module 34 may execute a pulse width modulation (PWM) control routine to selectively control the voltage magnitude of the three-phase AC electrical signal. To control the voltage magnitude of the three-phase AC electrical signal using the PWM control routine, the motor control module 34 is configured to selectively provide a biasing voltage to the switching devices of the power converter 20, thereby activating or deactivating the switching devices. As another example, the motor control module 34 may execute a direct actuation control routine to selectively control the voltage magnitude of the three-phase AC electrical signal. To control the voltage magnitude of the three-phase AC electrical signal using the direct actuation control routine, the motor control module 34 is configured to directly apply a voltage vector to the switching devices of the power converter 20 based on a predefined switching table stored in a memory of the controller 30.

In some forms, the motor control module 34 may selectively control the operation of the power converter 20 in response to user commands received via the controller 30 and feedback signals indicating various operational characteristics of the electric motor 40. The user commands may include, but are not limited to, a reference voltage request, a speed request, a torque request, and/or electric power requests, among others. The feedback signals may include, but are not limited to, phase current information obtained from the phase current sensors 50, rotor speed information obtained from the rotor speed sensor 60 and/or the rotor characteristic module 32, and/or rotor position information obtained from the rotor position sensor 65 and/or the rotor characteristic module 32, among others.

The electric motor 40 is an AC electrical machine configured to produce a torque required to drive a load. Example AC electrical machines include a synchronous electrical machine (e.g., a PMSM), an asynchronous electrical machine, a salient electrical machine, a non-salient electrical machine, among others. It should be understood that the electric motor 40 may be various types of AC electrical machines and is not limited to the examples described herein. While the electric motor 40 is illustrated as including the rotor 42, it should be understood that the electric motor 40 may include various other components not illustrated herein.

The phase current sensors 50 are configured to generate information representing a current magnitude of the AC electrical signal output by the power converter 20. As an example, the phase current sensors 50 may be a Hall effect sensor, a transformer, a current clamp meter, a fiber optic current sensor, and/or the like. In some forms, the number of phase current sensors 50 may be equal to the number of phases of the electric motor 40.

As described above, the rotor speed sensor 60 is configured to generate information representing a speed of the rotor 42, and the rotor position sensor 65 is configured to generate information representing the angular position of the rotor 42. As an example, the rotor speed sensor 60 and the rotor position sensor 65 may be an encoder, an electromagnetic resolver, and/or the like.

Figure 2A:
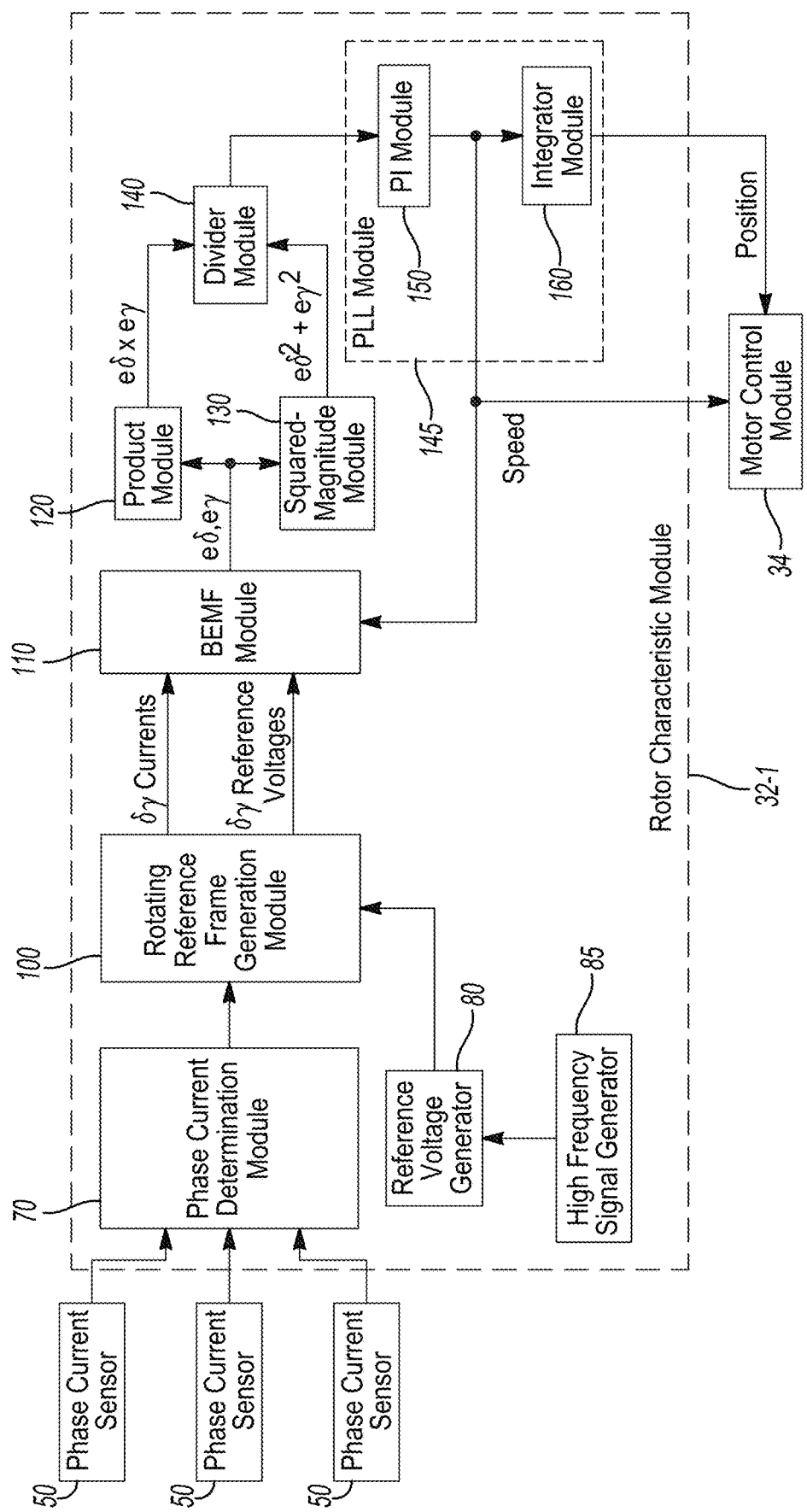
FIG. 2A is a block diagram of a system for determining a rotor speed and a rotor position according to the teachings of the present disclosure.

Referring to FIG. 2A, an example functional block diagram of the rotor characteristic module 32 (denoted as rotor characteristic module 32-1 in FIG. 2A) and the motor control module 34 is shown. The rotor characteristic module 32-1 may include a phase current determination module 70, a reference voltage generator 80, a high signal frequency generator 85, and a rotating reference frame generation module (RRFGM) 100. The rotor characteristic module 32-1 may also include a BEMF module 110, a product module 120, a squared-magnitude module 130, a divider module 140, and a PLL module 145 that includes a proportional-integral (PI) module 150 and an integrator module 160.

In some forms, the phase current determination module 70 determines the magnitude of the current provided to each phase of the electric motor 40 based on the sensor data obtained from the phase current sensors 50.

The reference voltage generator 80 injects a signal at a predefined frequency and voltage amplitude. That is, in one form, the frequency and amplitude of the injected signal are constant, and the frequency impedance is a function of the load current. In some variations, the injected signal may have a high frequency component generated by the high frequency signal generator 85, and the high frequency component may have a frequency range of, one-hundredth to one of the switching frequency, for example, 100 Hz to 10 kHz. The frequency and voltage amplitude of the injected signal may be defined by, for example, a user command provided to the controller 30 via an input device communicatively coupled thereto. As an example, the injected signal may be a sinusoidal signal or a square-wave signal having a 15V amplitude and a frequency of 500 Hz. It should be understood that the reference voltage generator 80 may inject other signal types (e.g., random signals, among others) having other frequencies and voltage amplitudes in other forms and is not limited to the examples described herein.

The RRFGM 100 converts the phase currents and the injected signal into a two axis rotating reference frame, such as the direct-quadrature-zero frame (hereinafter referred to as the dq-frame). The RRFGM 100 may convert the phase currents and the injected signal, which are each represented as vectors, into the dq-frame by performing a Clarke transform and a Park transform.

As an example, the RRFGM 100 may initially perform the Clarke transform to convert the vectors representing the phase currents and the injected voltages into a stationary quadrature axes representations (hereinafter referred to as the-αβ frame), as indicated by the following relations:

$$I_{\alpha\beta} = T_{\alpha\beta} I_{abc} \qquad (1)$$

$$V_{\alpha\beta} = T_{\alpha\beta} V_{abc} \qquad (2)$$

$$T_{\alpha\beta} = \frac{2}{3} \begin{bmatrix} 1 & -\frac{1}{2} & -\frac{1}{2} \\ 0 & \frac{\sqrt{3}}{2} & -\frac{\sqrt{3}}{2} \\ \frac{1}{2} & \frac{1}{2} & \frac{1}{2} \end{bmatrix} \qquad (3)$$

In relations (1), (2), and (3), Iαβ is the stationary axis quadrature axes representation of the phase currents, $V_{\alpha\beta}$ is the stationary axis quadrature axes representation of the injected voltage, and $T_{\alpha\beta}$ is the transformation matrix. After performing the Clarke transform, the RRFGM 100 may convert the stationary quadrature axes representations into the dq-frame representations by performing the Park transform, as indicated by the following relations:

$$I_{dq} = T_{dq} I_{\alpha\beta} \quad (4)$$

$$V_{dq} = T_{dq} V_{\alpha\beta} \quad (5)$$

$$T_{dq} = \frac{2}{3}\begin{bmatrix} \cos\theta & \sin\theta & 0 \\ -\sin\theta & \cos\theta & 0 \\ 0 & 0 & 1 \end{bmatrix} \quad (6)$$

In relations (4), (5), and (6), $I_{dq}$ is the dq-frame representation of the phase currents, $V_{dq}$ is the dq-frame representation of the injected voltage, $T_{dq}$ is the transformation matrix, and θ is the rotational angle in which the dq-frame is rotated from the αβ-frame.

Subsequently, the RRFGM 100 may convert the rotating axis quadrature axes representations into the estimated rotor reference frame (hereinafter referred to as the δγ-frame) by performing the Park transform, as indicated by the following relations:

$$I_{\delta\gamma} = T_{\delta\gamma} I_{dq} \quad (7)$$

$$V_{\delta\gamma} = T_{\delta\gamma} V_{dq} \quad (8)$$

$$T_{\delta\gamma} = \frac{2}{3}\begin{bmatrix} \cos\tilde{\theta} & \sin\tilde{\theta} & 0 \\ -\sin\tilde{\theta} & \cos\tilde{\theta} & 0 \\ 0 & 0 & 1 \end{bmatrix} \quad (9)$$

In relations (7), (8), and (9), $I_{\delta\gamma}$ is the δγ-frame representation of the phase currents, $V_{\delta\gamma}$ is the δγ-frame representation of the injected voltage, $T_{\delta\gamma}$ is the transformation matrix, and $\tilde{\theta}$ represents the rotational angle in which the δγ-frame is rotated from the dq-frame.

In response to converting the phase currents and the injected signal into the δγ-frame, the BEMF module 110 is configured to determine the orthogonal components of the extended BEMF model of the electric motor 40. The orthogonal components ($e_\delta$ and $e_\gamma$) may be represented using the following relation:

$$\begin{bmatrix} e_\delta \\ e_\gamma \end{bmatrix} = \begin{bmatrix} v_\delta^* \\ v_\gamma^* \end{bmatrix} - \begin{bmatrix} R_s + pL_d & -\hat{\omega}L_q \\ \hat{\omega}L_q & R_s + pL_d \end{bmatrix}\begin{bmatrix} i_\delta \\ i_\gamma \end{bmatrix} - Z_{dh}\begin{bmatrix} i_{\delta h} \\ i_{\gamma h} \end{bmatrix} \quad (10)$$

In relation (10), $v_\delta^*$ is the injected voltage in the δ-axis of the δγ-frame, $v_\gamma^*$ is the injected voltage in the γ-axis of the δγ-frame, $R_s$ is the stator resistance of the electric motor 40, p is a differential operator, $L_d$ is the inductance of the d-axis of the dq-frame, $L_q$ is the inductance of the q-axis of the dq-frame, and $\hat{\omega}$ is a previous iteration of the estimated rotor speed obtained from the PLL module 145. In the above relation, $i_{\delta h}$ is the high-frequency current response in the δ-axis of the δγ-frame caused by the injected signal, $i_{\gamma h}$ is the high-frequency current response in the γ axis caused by the injected signal, and $Z_{dh}$ is the high-frequency impedance in the d-axis of the dq-frame.

The above relation of the orthogonal components ($e_\delta$ and $e_\gamma$) of the extended BEMF model ($k_{bemf}$) may also be represented using the following relations:

$$\begin{bmatrix} e_\delta \\ e_\gamma \end{bmatrix} = k_{bemf}\begin{bmatrix} -\sin\tilde{\theta} \\ \cos\tilde{\theta} \end{bmatrix} \quad (11)$$

$$k_{bemf} = (L_d - L_q)(\hat{\omega}i_d - pi_q) + \hat{\omega}\psi_m + (Z_{qh} - Z_{dh})i_{qh} \quad (12)$$

In relations (11) and (12), $i_d$ is the current magnitude of the d-axis of the dq-frame, $i_q$ is the current magnitude of the q-axis of the dq-frame, $Z_{qh}$ is the high-frequency impedance of the q-axis of the dq-frame, $Z_{dh}$ is the high-frequency impedance of the d-axis of the dq-frame, $i_{qh}$ is the high-frequency current response of the q-axis of the dq-frame, $\psi_m$ is permanent magnet flux linkage, and $\tilde{\theta}$ is the angular position error. In some forms, the $Z_{qh}$ may be nonlinear and varies based on the frequency and amplitude of the injected signal and/or a load current of the electric motor 40.

When the BEMF module 110 determines the orthogonal components of the extended BEMF, the product module 120 is configured to obtain a product of the orthogonal components ($e_\delta \times e_\gamma$), as shown by the following relation:

$$e_\delta \times e_\gamma = \frac{-k_{bemf}^2}{2}\sin 2\tilde{\theta} \quad (13)$$

Accordingly, when the rotor 42 of the electric motor 40 is operating at lower speeds and/or near idle, the extended BEMF ($k_{bemf}$) may be represented using the following relation:

$$k_{bemf} = -(L_d - L_q)pi_q + (Z_{qh} - Z_{dh})i_{qh} \quad (14)$$

As such, the extended BEMF ($k_{bemf}$) is a non-zero value when a fundamental saliency is present, a slot leakage saliency is present, or a high-frequency impedance saliency, along with transients in the q-axis of the dq-frame, is present.

When the rotor 42 of the electric motor 40 is operating at higher speeds, the extended BEMF ($k_{bemf}$) may be represented using the following relation:

$$k_{bemf} = \{(L_d - L_q)i_d + \psi_m\}\hat{\omega} \quad (15)$$

Accordingly, the extended BEMF ($k_{bemf}$) is a non-zero value when the rotor 42 is not idle, a fundamental saliency is present, or a slot leakage saliency, along with an excitation in the d-axis of the dq-frame, is present.

When the BEMF module 110 determines the orthogonal components of the extended BEMF, the squared-magnitude module 130 is configured to obtain a squared-magnitude of the orthogonal components ($|e_{\delta\gamma}|^2$), as shown by the following relation:

$$|e_{\delta\gamma}|^2 = e_\delta^2 + e_\gamma^2 \quad (16)$$

The divider module 140 may then divide the product of the orthogonal components ($e_\delta \times e_\gamma$) by the squared-magnitude of the orthogonal components ($|e_{\delta\gamma}|^2$) to obtain the angular position error signal, as shown by the following relation:

$$\frac{e_\delta \times e_\gamma}{|e_{\delta\gamma}|^2} = -\frac{1}{2}\sin 2\tilde{\theta} \quad (17)$$

The PI module 150 of the PLL module 145 receives the angular position error signal and performs a proportional-integral routine on the position signal to obtain the estimated rotor speed. The PI module 150 then outputs the estimated rotor speed to the BEMF module 110, which utilizes the estimated rotor speed as a feedback parameter for determining the orthogonal components, as described above. Furthermore, the PI module 150 also outputs the estimated rotor speed to the motor control module 34, which selectively controls the operation of the power converter 20 based on the estimated rotor speed, as described above.

The integrator module 160 of the PLL module 145 receives the estimated rotor speed from the PI module 150 and performs an integration routine on the estimated rotor speed to obtain the estimated rotor position. The integrator module 160 then outputs the estimated rotor position to the motor control module 34, which selectively controls the operation of the power converter 20 based on the estimated rotor position, as described above.

By performing the signal conditioning routine described with reference to FIG. 2A, the rotor characteristic module 32-1 can determine the speed and the angular position of the rotor 42 without the use of the rotor speed sensor 60 and the rotor position sensor 65. While the example signal conditioning routine described in FIG. 2A describes converting the phase currents and the injected signal into a two axis rotating reference frame, the phase currents and the injected signal can be converted into a two axis stationary reference frame, as described below in further detail with reference to FIG. 2B.

Figure 2B:
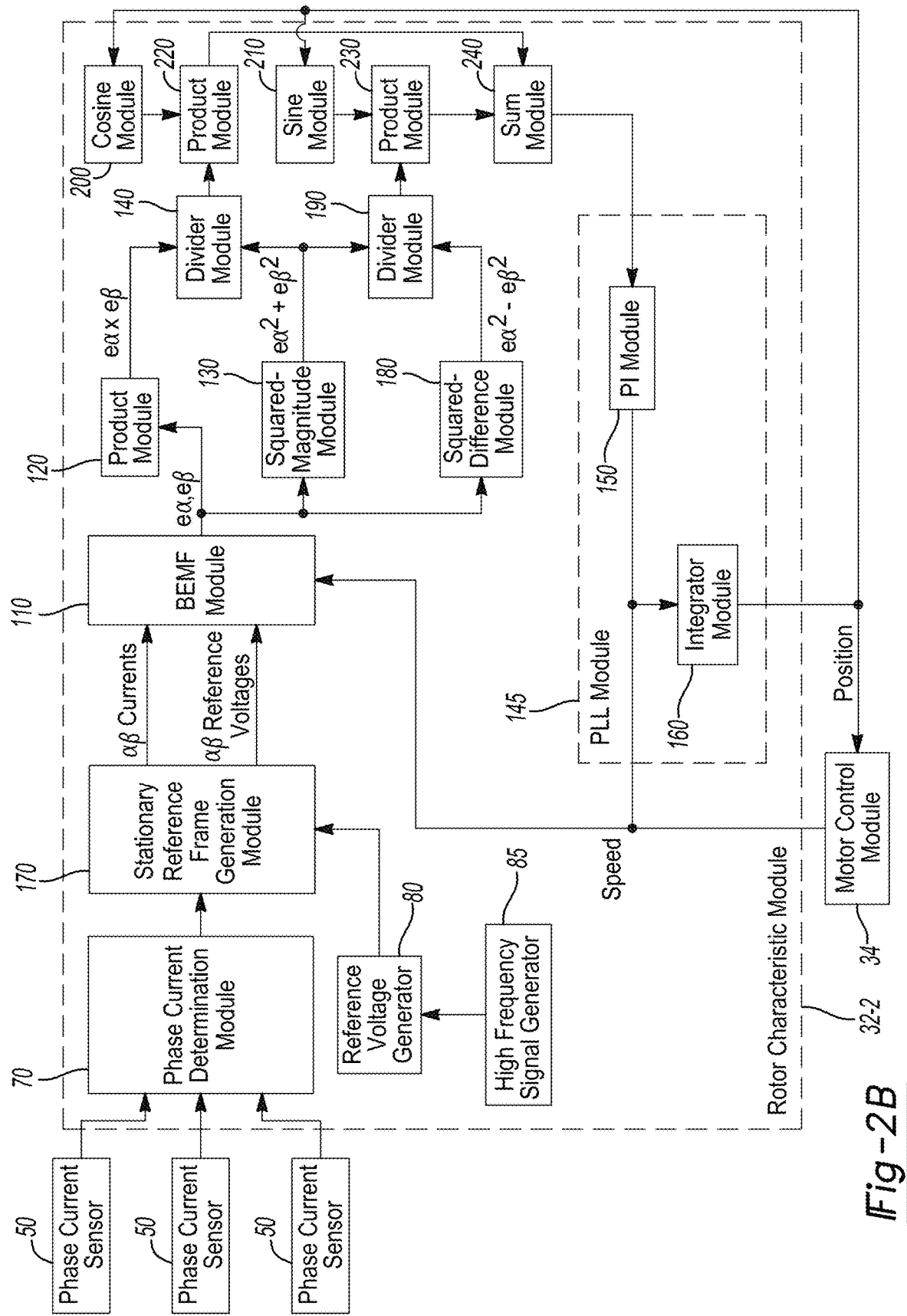
FIG. 2B is a block diagram of another system for determining a rotor speed and a rotor position according to the teachings of the present disclosure.
Figure 3:
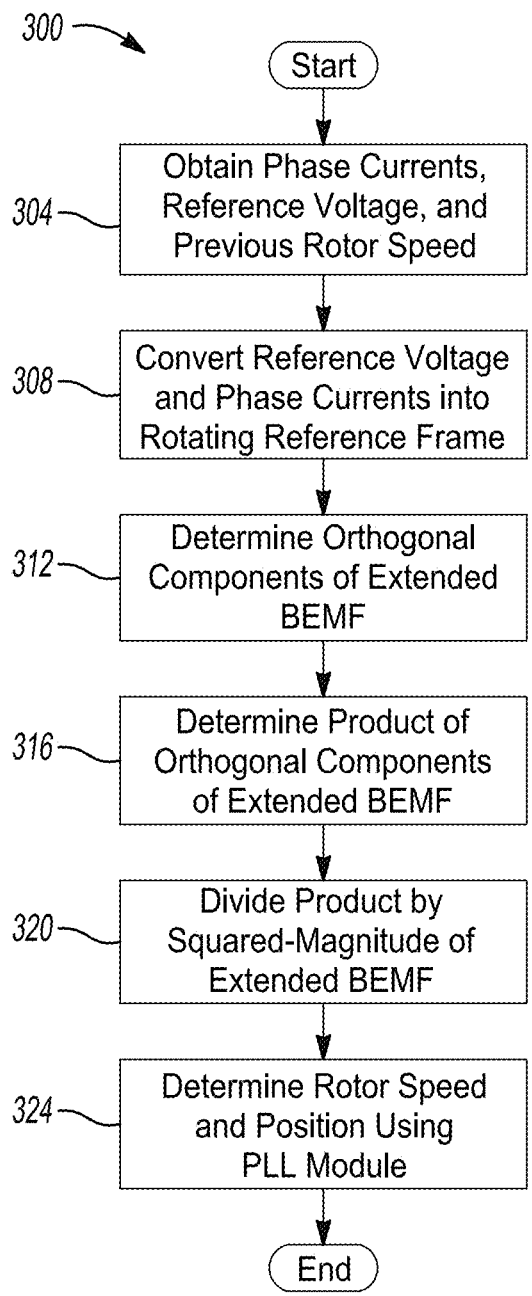
FIG. 3 is a flow chart for determining a rotor speed and a rotor position according to the teachings of the present disclosure.
Figure 4:
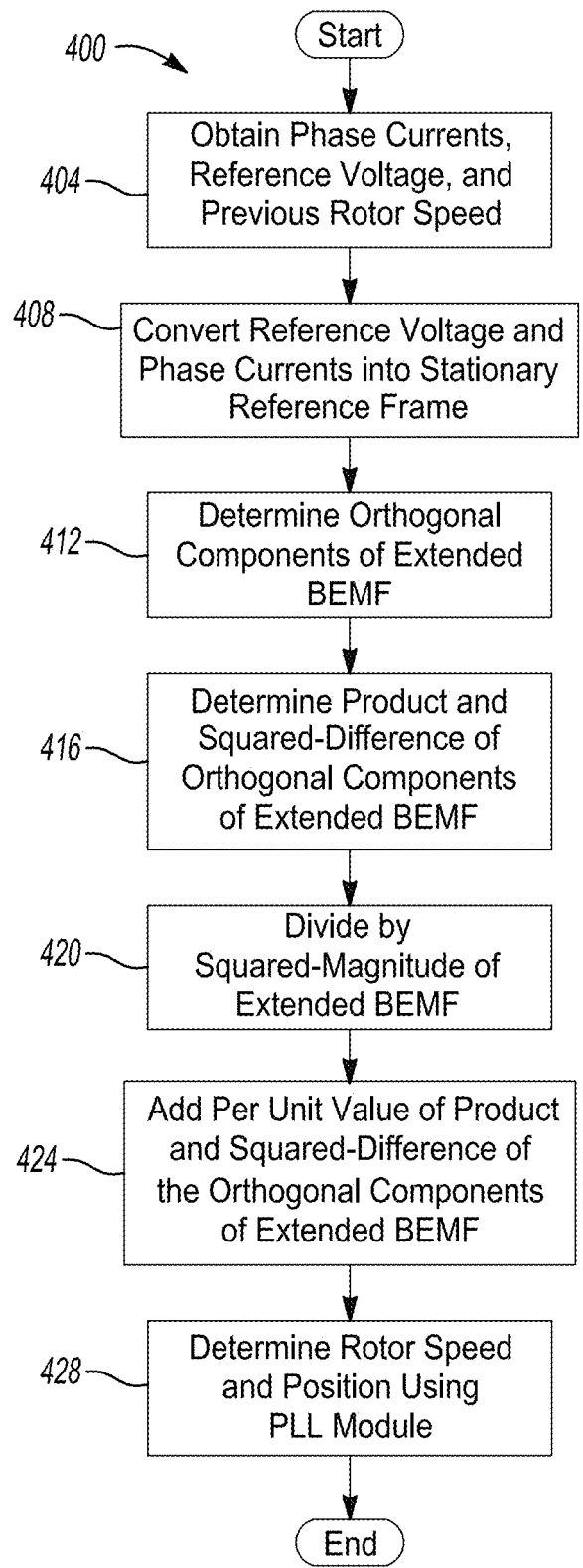
FIG. 4 is a flow chart for determining a rotor speed and a rotor position according to the teachings of the present disclosure.

Referring to FIG. 2B, another example functional block diagram of the rotor characteristic module 32 (denoted as rotor characteristic module 32-2) and the motor control module 34 is shown. The rotor characteristic module 32-2 may include the phase current determination module 70, the reference voltage generator 80, the high signal frequency generator 85, the BEMF module 110, the product module 120, the squared-magnitude module 130, the divider module 140, and the PLL module 145. The rotor characteristic module 32-2 may also include a stationary reference frame generation module (SRFGM) 170, a squared-difference module 180, a divider module 190, a cosine module 200, a sine module 210, a product module 220, a product module 230, and a sum module 240.

The SRFGM 170 converts the phase currents and the injected signal into a two axis stationary reference frame, such as the αβ-frame. The SRFGM 170 may convert the phase currents and the injected signal, which are each represented as vectors, into the αβ-frame by performing a Clarke transform. As an example, the SRFGM 170 may perform the Clarke transform to convert the vectors representing the phase currents and the injected voltages using the following relations as indicated by the following relations:

$$I_{\alpha\beta} = T_{\alpha\beta} I_{abc} \tag{18}$$

$$V_{\alpha\beta} = T_{\alpha\beta} V_{abc} \tag{19}$$

$$T_{\alpha\beta} = \frac{2}{3} \begin{bmatrix} 1 & -\frac{1}{2} & -\frac{1}{2} \\ 0 & \frac{\sqrt{3}}{2} & -\frac{\sqrt{3}}{2} \\ \frac{1}{2} & \frac{1}{2} & \frac{1}{2} \end{bmatrix} \tag{20}$$

In relations (18), (19), and (20), $I_{\alpha\beta}$ is the stationary axis quadrature axes representation of the phase currents, $V_{\alpha\beta}$ is the stationary axis quadrature axes representation of the injected voltage, and $T_{\alpha\beta}$ is the transformation matrix.

In response to converting the phase currents and the injected signal into the αβ-frame, the BEMF module 110 is configured to determine the orthogonal components of the extended BEMF model of the electric motor 40. The orthogonal components ($e_\alpha$ and $e_\beta$) may be represented using the following relation:

$$\begin{bmatrix} e_\alpha \\ e_\beta \end{bmatrix} = \begin{bmatrix} v_\alpha^* \\ v_\beta^* \end{bmatrix} - \begin{bmatrix} R_s + pL_d & -\hat{\omega}L_q \\ \hat{\omega}L_q & R_s + pL_d \end{bmatrix} \begin{bmatrix} i_\alpha \\ i_\beta \end{bmatrix} - Z_{dh} \begin{bmatrix} i_{\alpha h} \\ i_{\beta h} \end{bmatrix} \tag{21}$$

In relation (21), $v_\alpha^*$ is the injected voltage in the α-axis of the αβ-frame, $v_\beta^*$ is the injected voltage in the β-axis of the αβ-frame, $R_s$ is the stator resistance of the electric motor 40, p is a differential operator, $L_d$ is the inductance of the d-axis of the dq-frame, $L_q$ is the inductance of q-axis of the dq-frame, and $\hat{\omega}$ is a previous iteration of the estimated rotor speed obtained from the PLL module 145. In the above relation, $i_{\alpha h}$ is the high-frequency current response in the α-axis of the αβ-frame caused by the injected signal, $i_{\beta h}$ is the high-frequency current response in the β-axis caused by the injected signal, and $Z_{dh}$ is the high-frequency impedance in the d-axis of the dq-frame.

The above relation of the orthogonal components ($e_\alpha$ and $e_\beta$) of the extended BEMF model ($k_{bemf}$) may also be represented using the following relations:

$$\begin{bmatrix} e_\alpha \\ e_\beta \end{bmatrix} = k_{bemf} \begin{bmatrix} -\sin\theta \\ \cos\theta \end{bmatrix} \tag{22}$$

$$k_{bemf} = (L_d - L_q)(\hat{\omega}i_\alpha - pi_\beta) + \hat{\omega}\psi_m + (Z_{qh} - Z_{dh})i_{\beta h} \tag{23}$$

In relations (22) and (23), $i_\alpha$ is the current magnitude of the α-axis of the αβ-frame, $i_\beta$ is the current magnitude of the β-axis of the αβ-frame, $Z_{qh}$ is the high-frequency impedance of the q-axis of the dq-frame, $Z_{dh}$ is the high-frequency impedance of the d-axis of the dq-frame, $i_{\beta h}$ is the high-frequency current response of the β-axis of the αβ-frame, $\psi_m$ is permanent magnet flux linkage, and θ is the angular position of the rotor 42. In some forms, the $Z_{qh}$ may be nonlinear and varies based on the frequency and amplitude of the injected signal and/or a load current of the electric motor 40.

When the BEMF module 110 determines the orthogonal components of the extended BEMF, the product module 120 is configured to obtain a product of the orthogonal components ($e_\alpha \times e_\beta$), as shown by the following relation:

$$e_\alpha \times e_\beta = \frac{-k_{bemf}^2}{2}\sin 2\theta \tag{24}$$

When the BEMF module 110 determines the orthogonal components of the extended BEMF, the squared-magnitude module 130 is configured to obtain a squared-magnitude of the orthogonal components ($|e_{\alpha\beta}|^2$), as shown by the following relation:

$$|e_{\alpha\beta}|^2 = e_\alpha^2 + e_\beta^2 \tag{25}$$

Likewise, when the BEMF module 110 determines the orthogonal components of the extended BEMF, the squared-difference module 180 is configured to obtain a squared-difference of the orthogonal components ($|e_{difference}|^2$), as shown by the following relation:

$$|e_{difference}|^2 = e_\alpha^2 - e_\beta^2 \tag{26}$$

The divider module 140 may then divide the product of the orthogonal components ($e_\alpha \times e_\beta$) by the squared-magnitude of the orthogonal components ($|e_{\alpha\beta}|^2$) to obtain a first angular position error signal ($e_1$), as shown by the following relation:

$$\frac{e_\alpha \times e_\beta}{|e_{\alpha\beta}|^2} = -\frac{1}{2}\sin 2\theta = e_1 \quad (27)$$

Likewise, the divider module 190 may then divide the squared-magnitude of the orthogonal components ($|e_{\alpha\beta}|^2$) by the squared-difference of the orthogonal components ($|e_{difference}|^2$) to obtain a second angular position error signal ($e_2$), as shown by the following relation:

$$\frac{|e_{difference}|^2}{|e_{\alpha\beta}|^2} = \frac{1}{2}\cos 2\theta = e_2 \quad (28)$$

The product module 220 is configured to obtain a product of the first angular position error signal output by the divider module 140 ($e_1$) and the value output by the cosine module 200, which is configured to obtain a cosine value of double the previous estimated angular position output by the PLL module 145 ($2\hat{\theta}$). The signal output by the product module 220 ($e_1^*$), is shown by the following relation:

$$e_1^* = e_1 \times \cos 2\hat{\theta} \quad (29)$$

The product module 230 is configured to obtain a product of the first angular position error signal output by the divider module 140 ($e_2$) and the value output by the sine module 210, which is configured to obtain a sine value of double the previous estimated angular position output by the PLL module 145 ($2\hat{\theta}$). The signal output by the product module 230 ($e_2^*$), is shown by the following relation:

$$e_2^* = e_2 \times \sin 2\hat{\theta} \quad (30)$$

The sum module 240 may then add the signal output by the product module 220 ($e_1^*$) and the signal output by the product module 230 ($e_2^*$) to obtain the angular position error signal, as shown by the following relation:

$$e_1^* + e_2^* = -\frac{1}{2}\sin 2\tilde{\theta} \quad (31)$$

As described above, the PLL module 145 then outputs the estimated rotor speed and the estimated rotor position to the BEMF module 110 as a feedback parameter for determining the orthogonal components and to the motor control module 34 for controlling the operation of the power converter 20 based on the estimated rotor position. By performing the signal conditioning routine described with reference to FIG. 2B, the rotor characteristic module 32-2 can determine the speed and the angular position of the rotor 42 without the use of the rotor speed sensor 60 and the rotor position sensor 65.

Referring to FIGS. 1, 2A-2B, and 3, an example routine 300 is shown. The routine 300 represents an example signal conditioning routine for estimating the rotor position and rotor speed using the two axis rotating reference frame (i.e., the δγ-frame). At 304, the controller 30 obtains the phase currents from the phase current sensors 50, a reference voltage (i.e., the injected voltage), and the previous estimated rotor speed. At 308, the controller 30 converts the reference voltage and the phase currents into the rotating reference frame components (i.e., the controller converts the reference voltage and the phase currents into the δγ-frame). At 312, the controller 30 determines the orthogonal components of the extended BEMF model. At 316, the controller 30 determines the product of the orthogonal components of the extended BEMF model. At 320, the controller 30 divides the product of the orthogonal components by the squared-magnitude of the extended BEMF model. At 324, the controller 30 determines the rotor speed and the rotor position using the PLL module 145 of the controller 30.

Referring to FIGS. 1, 2A-2B, and 4, an example routine 400 is shown. The routine 400 represents an example signal conditioning routine for estimating the rotor position and rotor speed using the two axis stationary reference frame (i.e., the αβ-frame). At 404, the controller 30 obtains the phase currents from the phase current sensors 50, a reference voltage (i.e., the injected voltage), and the previous estimated rotor speed. At 408, the controller 30 converts the reference voltage and the phase currents into the stationary reference frame components (i.e., the controller 30 converts the reference voltage and the phase currents into the αβ-frame). At 412, the controller 30 determines the orthogonal components of the extended BEMF model. At 416, the controller 30 determines the product and squared-difference of the orthogonal components of the extended BEMF model. At 420, the controller 30 divides the product and squared-difference of the orthogonal components by the squared-magnitude of the extended BEMF model. At 424, the controller 30 adds the per-unit value of the product and squared-difference of the orthogonal components of the extended BEMF model. At 428, the controller 30 determines the rotor speed and the rotor position using the PLL module 145 of the controller 30.

It should be understood that routines 300, 400 are merely example control routines and other control routines may be implemented.

By performing the signal conditioning routine described herein, the rotor position and rotor speed of AC electric machines at idle, low, and high operating speeds can be calculated without the use of the rotor position sensors and rotor speed sensors, thereby reducing the size of the AC electric machine and the complexity of the controller logic needed to process the sensor data. Furthermore, the signal conditioning routine, when executed, can be utilized in conjunction with the rotor position sensor and/or the rotor speed sensor to identify faulty rotor position sensors and/or rotor speed sensors.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and nontransitory. Non-limiting examples of a nontransitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method for determining a rotor characteristic of an alternating current (AC) electrical machine, the method comprising:
   injecting a reference voltage signal, wherein the reference voltage signal has a predefined amplitude and a predefined frequency;
   obtaining one or more phase currents and rotor data;
   determining orthogonal components of an extended back electromotive force (BEMF) model of the AC electrical machine based on the reference voltage signal, the one or more phase currents, and the rotor data;
   determining a product of the orthogonal components of the extended BEMF model;
   determining a squared-magnitude of the orthogonal components of the extended BEMF model;
   determining the rotor characteristic of the AC electrical machine based on the product of the orthogonal components and the squared-magnitude of the orthogonal components; and
   controlling an output voltage provided to the AC electrical machine based on the rotor characteristic of the AC electrical machine.

2. The method of claim 1, wherein the rotor characteristic is at least one of a rotor position and a rotor speed.

3. The method of claim 1, wherein determining the orthogonal components of the extended BEMF model of the AC electrical machine further comprises converting at least one of the reference voltage signal, the one or more phase currents, and the rotor data into a two axis rotating reference frame.

4. The method of claim 1, wherein determining the rotor characteristic of the AC electrical machine based on the product of the orthogonal components and the squared-magnitude of the orthogonal components further comprises generating an angular position error signal.

5. The method of claim 4, wherein determining the rotor characteristic of the AC electrical machine based on the product of the orthogonal components and the squared-magnitude of the orthogonal components further comprises determining a rotor speed based on the angular position error signal.

6. The method of claim 4, wherein determining the rotor characteristic of the AC electrical machine based on the product of the orthogonal components and the squared-magnitude of the orthogonal components further comprises:
   determining a rotor speed based on the angular position error signal; and
   determining a rotor position based on the rotor speed.

7. The method of claim 4, wherein generating the angular position error signal further comprises dividing the product of the orthogonal components by the squared-magnitude of the orthogonal components.

8. The method of claim 4, wherein generating the angular position error signal further comprises:
   generating a first angular position error signal based on the product of the orthogonal components and the squared-magnitude of the orthogonal components;
   generating a second angular position error signal based on the squared-magnitude of the orthogonal components and a squared-difference of the orthogonal components; and
   generating the angular position error signal based on the first angular position error signal and the second angular position error signal.

9. The method of claim 8, wherein the rotor characteristic of the AC electrical machine is further based on the angular position error signal.

10. A method for determining a rotor characteristic of an alternating current (AC) electrical machine, the method comprising:
    obtaining a reference voltage signal, one or more phase currents and rotor data;
    determining orthogonal components of an extended back electromotive force (BEMF) model of the AC electrical machine based on the reference voltage signal, the one or more phase current characteristics, and the rotor data;
    determining a product of the orthogonal components of the extended BEMF model;
    determining a squared-magnitude of the orthogonal components of the extended BEMF model; and determining the rotor characteristic of the AC electrical machine based on the product of the orthogonal components and the squared-magnitude of the orthogonal components; and controlling an output voltage provided to the AC electrical machine based on the rotor characteristic of the AC electrical machine;

wherein determining the rotor characteristic of the AC electrical machine based on the product of the orthogonal components and the squared-magnitude of the orthogonal components further comprises generating an angular position error signal; and wherein generating the angular position error signal further comprises dividing the product of the orthogonal components by the squared-magnitude of the orthogonal components.

11. A method for determining a rotor characteristic of an alternating current (AC) electrical machine, the method comprising:

obtaining a reference voltage signal, one or more phase current and rotor data;

determining orthogonal components of an extended back electromotive force (BEMF) model of the AC electrical machine based on the reference voltage signal, the one or more phase current characteristics, and the rotor data;

determining a product of the orthogonal components of the extended BEMF model;

determining a squared-magnitude of the orthogonal components of the extended BEMF model;

determining a squared-difference of the orthogonal components of the extended BEMF model;

determining the rotor characteristic of the AC electrical machine based on the product of the orthogonal components, the squared-magnitude of the orthogonal components, and the squared-difference of the orthogonal components; and controlling an output voltage provided to the AC electrical machine based on the rotor characteristic of the AC electrical machine;

wherein determining the rotor characteristic of the AC electrical machine based on the product of the orthogonal components and the squared-magnitude of the orthogonal components further comprises generating an angular position error signal; and wherein generating the angular position error signal further comprises dividing the product of the orthogonal components by the squared-magnitude of the orthogonal components.

12. A method for determining a rotor characteristic of an alternating current (AC) electrical machine, the method comprising:

injecting a reference voltage signal, wherein the reference voltage signal has a predefined amplitude and a predefined frequency;

obtaining one or more phase currents and rotor data;

determining orthogonal components of an extended back electromotive force (BEMF) model of the AC electrical machine based on the reference voltage signal, the one or more phase currents, and the rotor data;

determining a product of the orthogonal components of the extended BEMF model;

determining a squared-magnitude of the orthogonal components of the extended BEMF model;

determining a squared-difference of the orthogonal components of the extended BEMF model;

determining the rotor characteristic of the AC electrical machine based on the product of the orthogonal components, the squared-magnitude of the orthogonal components, and the squared-difference of the orthogonal components; and controlling an output voltage provided to the AC electrical machine based on the rotor characteristic of the AC electrical machine.

13. The method of claim 12, wherein the rotor characteristic is at least one of a rotor position and a rotor speed.

14. The method of claim 12, wherein determining the orthogonal components of the extended BEMF model of the AC electrical machine further comprises converting at least one of the reference voltage signal, the one or more phase currents, and the rotor data into a two axis stationary reference frame.

15. The method of claim 12, wherein determining the rotor characteristic of the AC electrical machine based on the product of the orthogonal components and the squared-magnitude of the orthogonal components further comprises generating an angular position error signal.

16. The method of claim 15, wherein determining the rotor characteristic of the AC electrical machine based on the product of the orthogonal components and the squared-magnitude of the orthogonal components further comprises determining a rotor speed based on the angular position error signal.

17. The method of claim 15, wherein generating the angular position error signal further comprises converting a previous rotor position to the angular position error signal.

18. The method of claim 15, wherein generating the angular position error signal further comprises:

generating a first angular position error signal based on the product of the orthogonal components and the squared-magnitude of the orthogonal components;

generating a second angular position error signal based on the squared-magnitude of the orthogonal components and the squared-difference of the orthogonal components; and generating the angular position error signal based on the first angular position error signal and the second angular position error signal.

19. The method of claim 18, wherein the rotor characteristic of the AC electrical machine is further based on the angular position error signal.

20. The method of claim 15, wherein generating the angular position error signal further comprises dividing the product of the orthogonal components by the squared-magnitude of the orthogonal components.

21. A system for determining a rotor characteristic of an alternating current (AC) electrical machine, the system comprising:

one or more processors; and one or more nontransitory computer-readable mediums comprising instructions that are executable by the one or more processors, wherein the instructions comprise:

injecting a reference voltage signal, wherein the reference voltage signal has a predefined amplitude and a predefined frequency;

obtaining one or more phase currents and rotor data;

determining orthogonal components of an extended back electromotive force (BEMF) model of the AC electrical machine based on the reference voltage signal, the one or more phase currents, and the rotor data;

determining a product of the orthogonal components of the extended BEMF model;

determining a squared-magnitude of the orthogonal components of the extended BEMF model;

determining the rotor characteristic of the AC electrical machine based on the product of the orthogonal components and the squared-magnitude of the orthogonal components; and controlling an output voltage provided to the AC electrical machine based on the rotor characteristic of the AC electrical machine.

22. A system for determining a rotor characteristic of an alternating current (AC) electrical machine, the system comprising:

one or more processors; and one or more nontransitory computer-readable mediums comprising instructions that are executable by the one or more processors, wherein the instructions comprise: injecting a reference voltage signal, wherein the reference voltage signal has a predefined amplitude and a predefined frequency;

obtaining one or more phase currents and rotor data;

determining orthogonal components of an extended back electromotive force (BEMF) model of the AC electrical machine based on the reference voltage signal, the one or more phase currents, and the rotor data;

determining a product of the orthogonal components of the extended BEMF model;

determining a squared-magnitude of the orthogonal components of the extended BEMF model;

determining a squared-difference of the orthogonal components of the extended BEMF model;

determining the rotor characteristic of the AC electrical machine based on the product of the orthogonal components, the squared-magnitude of the orthogonal components, and the squared-difference of the orthogonal components; and controlling an output voltage provided to the AC electrical machine based on the rotor characteristic of the AC electrical machine.

\* \* \* \* \*